United States Patent
Nag et al.

(10) Patent No.: US 10,296,169 B2
(45) Date of Patent: May 21, 2019

(54) INTERACTIVE CLOUD BASED CONTENT DELIVERY SERVICE

(71) Applicant: SONY INTERACTIVE ENTERTAINMENT LLC, San Mateo, CA (US)

(72) Inventors: Amit Nag, New York, NY (US); Daniel Myers, San Diego, CA (US); Benjamin Ackerman, Los Angeles, CA (US); Mathieu Verbeeck, San Francisco, CA (US); Carsten Schwesig, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 508 days.

(21) Appl. No.: 14/938,799

(22) Filed: Nov. 11, 2015

(65) Prior Publication Data

US 2016/0170582 A1 Jun. 16, 2016

Related U.S. Application Data

(60) Provisional application No. 62/078,292, filed on Nov. 11, 2014.

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0485* (2013.01); *G06F 3/04817* (2013.01);
(Continued)

(58) Field of Classification Search
CPC ..................... G06F 17/30867; G06F 17/30873
See application file for complete search history.

(56) References Cited

U.S. PATENT DOCUMENTS

| 8,191,101 | B2 | 5/2012 | Baran et al. | |
|---|---|---|---|---|
| 9,445,146 | B2 * | 9/2016 | Maier | H04N 5/4403 |

(Continued)

FOREIGN PATENT DOCUMENTS

| EP | 1094665 | 4/2001 |
|---|---|---|
| WO | WO2006081577 | 8/2006 |

OTHER PUBLICATIONS

Zia, M.Z.; Intell. Autonomous Syst. (IAS) group, Tech. Univ. Munchen, Garching, Germany Klank, U. ; Beetz, M.; Source: http://ieeexplore.ieee.org/xpl/articleDetails.jsp?tp=&arnumber=5174797&url=http%3A%2F%2Fieeexplore.ieee.org%2Fxpls%2Fabs_all.jsp%3Farnumber%3D5174797.

*Primary Examiner* — Rayeez R Chowdhury
(74) *Attorney, Agent, or Firm* — Trellis IP Law Group, PC

(57) ABSTRACT

A method for interactive delivery of cloud-based content to a user viewing a display comprises displaying a main interface screen on the display. The main interface screen comprises a background, presenting selected streamed content; a foreground overlay, comprising a timeline-based cross information bar; and a header presenting a plurality of control icons. In one aspect, the background reaches the boundaries of the display, the cross information bar comprises a vertical bar, comprising a scrollable listing of content categories, and a horizontal bar, comprising a listing of representations of cloud-based content the user is authorized to access, such that when the user selects one of the content categories, the horizontal bar extends to the right from the selected category listing, and is populated with
(Continued)

representations of content corresponding to the selected category.

14 Claims, 9 Drawing Sheets

(51) Int. Cl.
*G06F 3/0485* (2013.01)
*G06F 16/438* (2019.01)
*G06F 16/532* (2019.01)
*G06F 16/26* (2019.01)
*G06F 16/43* (2019.01)
*G06F 16/44* (2019.01)

(52) U.S. Cl.
CPC .............. *G06F 16/26* (2019.01); *G06F 16/43* (2019.01); *G06F 16/438* (2019.01); *G06F 16/447* (2019.01); *G06F 16/532* (2019.01)

(56) References Cited

U.S. PATENT DOCUMENTS

| | | | |
|---|---|---|---|
| 2003/0090524 A1* | 5/2003 | Segerberg | H04N 5/44543 715/786 |
| 2008/0016525 A1 | 1/2008 | Cai et al. | |
| 2012/0102418 A1* | 4/2012 | Joy | G06F 17/30056 715/762 |
| 2014/0053195 A1* | 2/2014 | Sirpal | G06F 3/017 725/40 |
| 2014/0088952 A1* | 3/2014 | Fife | G06F 17/27 704/9 |
| 2014/0289668 A1* | 9/2014 | Mavrody | G06F 3/04886 715/781 |

* cited by examiner

INTERACTIVE CLOUD BASED CONTENT DELIVERY SERVICE

CROSS REFERENCES TO RELATED APPLICATIONS

This application claims priority from U.S. Provisional Patent Application Ser. No. 62/078,292, entitled INTERACTIVE CLOUD BASED CONTENT DELIVERY SERVICE, filed on Nov. 11, 2014, which is hereby incorporated by reference as if set forth in full in this application for all purposes.

This application is related to the following applications, U.S. patent application Ser. No. 14/937,654, entitled "Tiled Search Results", filed on Nov. 10, 2015, and U.S. patent application Ser. No. 14/937,618, entitled "Customizable Electronic Program Guide", filed on Nov. 10, 2015, which are hereby incorporated by reference as if set forth in full in this application for all purposes.

BACKGROUND

Cable and satellite providers have control over significant amounts of content (e.g. movies, televisions shows, entertainment specials) that they provide to their customers. Searching through the vast amount of content made available by these providers may be a daunting and frustrating task, even though the "universe" of content choices may be limited to those included within the particular pay package that a particular customer pays for. Any given pay package may include many providers, channels and shows that the customer is simply not interested in. Moreover, current methodologies in place to browse, search, and filter content options tend to be non-engaging and non-intuitive. As such, there is a need for improved systems and methods for delivering cloud-based content delivery services and user interfaces that allow for intuitive interactions that are more time-efficient for the user, simpler, and may even be visually stimulating and engaging.

SUMMARY

Embodiments of the present invention generally relate to methods, systems and user interfaces for interactive delivery of cloud-based (e.g. streaming) content to a user. In one embodiment, the method comprises displaying a main interface screen on a display, the main interface screen comprising a background, presenting selected content that is streamed to a user, a foreground overlay, presenting a timeline-based cross information bar, and a header presenting a plurality of control icons. The streamed content may include live broadcasts from content providers, recorded or previously saved content from content providers and video on demand content.

In another embodiment, an apparatus comprises one or more processors; and logic encoded in one or more tangible media for execution by the one or more processors. When the logic is executed, cloud-based content is streamed to a user, in part, by displaying a main interface screen on a display, where the main interface screen comprises a background, presenting selected streamed content, a foreground overlay, presenting a timeline-based cross information bar; and a header presenting a plurality of control icons. The streamed content may include live broadcasts from content providers, recorded or previously saved content from content providers and video on demand content.

A further understanding of the nature and the advantages and features of present invention may be realized by reference of the remaining portions of the specification and the attached drawings.

DETAILED DESCRIPTION OF EMBODIMENTS

Embodiments described herein enable a user to quickly and easily interact with a cloud-based content delivery system, which provides streaming content based on user selection and preferences. Embodiments generally relate to providing on a display screen of a television, a game console, a set top box, a mobile device, for example, a tablet or smart phone or similar electronic device coupled to or including interface screens through which actions such as searching for a particular item of content, exploring available content fitting selected criteria, searching listings of content available for viewing or designating particular shows or channels as favorites may be carried out with ease and efficiency. Examples of typical content for viewing on the display screen include movies and TV shows or live events, for example, concerts and sporting events.

The present invention addresses the time-consuming inconvenience for content delivery service subscriber, who is typically presented with an unmanageably large number of content choices, often organized alphabetically rather than by any other more intuitive or subtle criterion, and who may be required to navigate through long sequences of selections each time a content choice is made, even when the choice is one that is routinely made, for example to watch the latest episode of one of the subscriber's favorite TV shows, regularly shown on a particular TV channel. The present invention offers the user (e.g. subscriber) quick, simple, and intuitive ways to specify criteria that limit the number of content items shown, to search and explore among the plethora of available content, and to designate (and then watch at leisure) favorite shows and/or channels.

Figure 1:
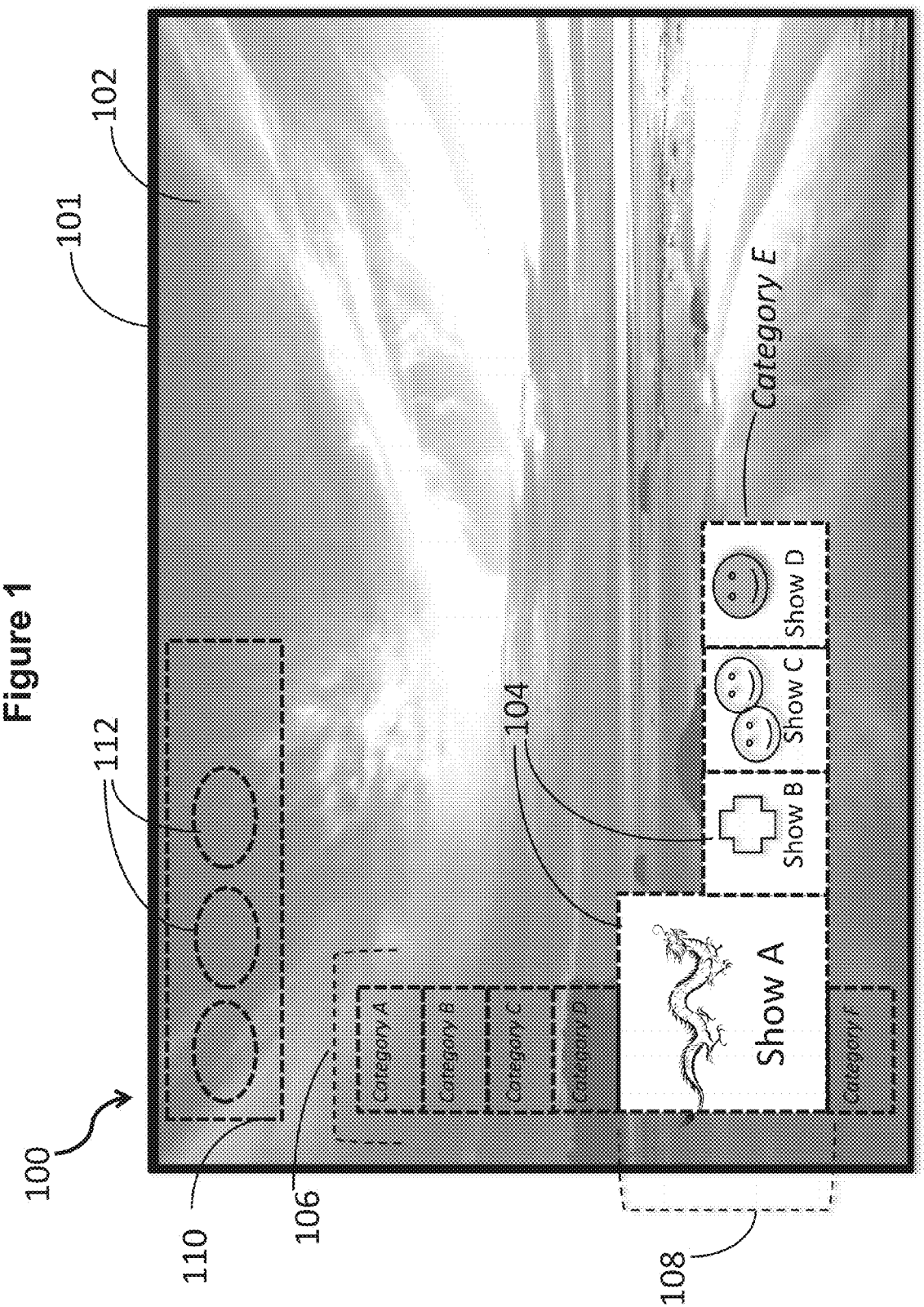
FIG. 1 is a representation of the main interface screen according to one embodiment.

FIG. 1 is a representation of the main interface screen presented to the user in one embodiment of the invention. The main interface screen 100 filling display 101 includes a background 102, on which selected content is played or otherwise presented to the user, a foreground overlay 104, comprising a timeline-based cross information bar 106,108, and a header 110 presenting a plurality of control icons 112. Header 110 is present as an overlay on background 102, which extends across the full width and height of the display.

Cross information bar 104 comprises a vertical bar 106, comprising a scrollable listing of content categories, for example, "You're Watching", "My Shows", "Favorite Channels", "Live TV", "Recommended for You" and "Featured Shows" (shown as A, B, C, D, E, and F) and a horizontal bar 108, comprising a listing of representations of program content that may be streamed to the user based on the user's access authorization, such that when the user selects one of the content categories, category E in the case illustrated, horizontal bar 108 extends to the right from the selected category listing, category E, and is populated with representations of available content corresponding to the selected category. Other category labels may be in used in addition to or in place the foregoing labels as applicable to a given implementation.

In some embodiments, the content representations listed in the horizontal bar 108 are presented in a time-based order, with time progression increasing from left to right. In some of these embodiments, the content representation displayed in the left-most position of horizontal bar 108 represents content currently playing in the background 102 of main interface screen 100. In some other of these embodiments, the content representation displayed in the left-most position of horizontal bar 108 represents content previously played (or viewed) by the user, and the content representation adjacent to the left-most position represents content currently playing (or viewed) in the background 102 of main interface screen 100.

In some embodiments, each of the content representations displayed in horizontal bar 108 on main interface display 100 comprises textual information and graphical representations, images or scenes specific to the corresponding content. This generally results in a more visually engaging and meaningful interaction with the user than is provided by currently available content delivery systems. Such a "tiled" display is discussed further below and in U.S. application Ser. No. 14,937,654, titled "Tiled Search Results", filed Nov. 10, 2015, which is incorporated by reference in its entirety herein.

When the content category "Live TV" is selected from the vertical bar 106, the applicable tiled content representation items present what programs are being broadcast on the several channels that the user has subscribed to. In an exemplary embodiment, the user subscribes to a package which includes access to a corresponding number of program channels. The larger (or higher tier) the package, the greater number of channels the user has access to. In an alternate embodiment, the user may subscribe to only a select number of individual channels in an a-la-carte manner. In either subscription model, the user only has access to and is streamed the content they subscribe to or are interested in, along with corresponding recommendations based, at least in part, on their channel preference.

When the content category "Recommended for You" (or some similar wording indicating a basis of user-defined criteria) is selected from vertical bar 106, the recommendations for content shown on horizontal bar 108 may be based on the user's viewing history and/or on preferences previously input by the user. In some embodiments, a category "Recommended by Viewers" (or similar wording indicating a basis of other viewer's preferences) may be included, for which the recommendations may be based, for example, on similarity of viewing habits and selections of other persons within a user's social network, or on the popularity of the corresponding content based on total number of views (e.g. Nielsen ratings). In all rows, notwithstanding the category selected, the first or otherwise active tile is larger than the remaining tiles. This provides the user with an easier to view and more pleasant viewing and reviewing experience.

Figure 2:
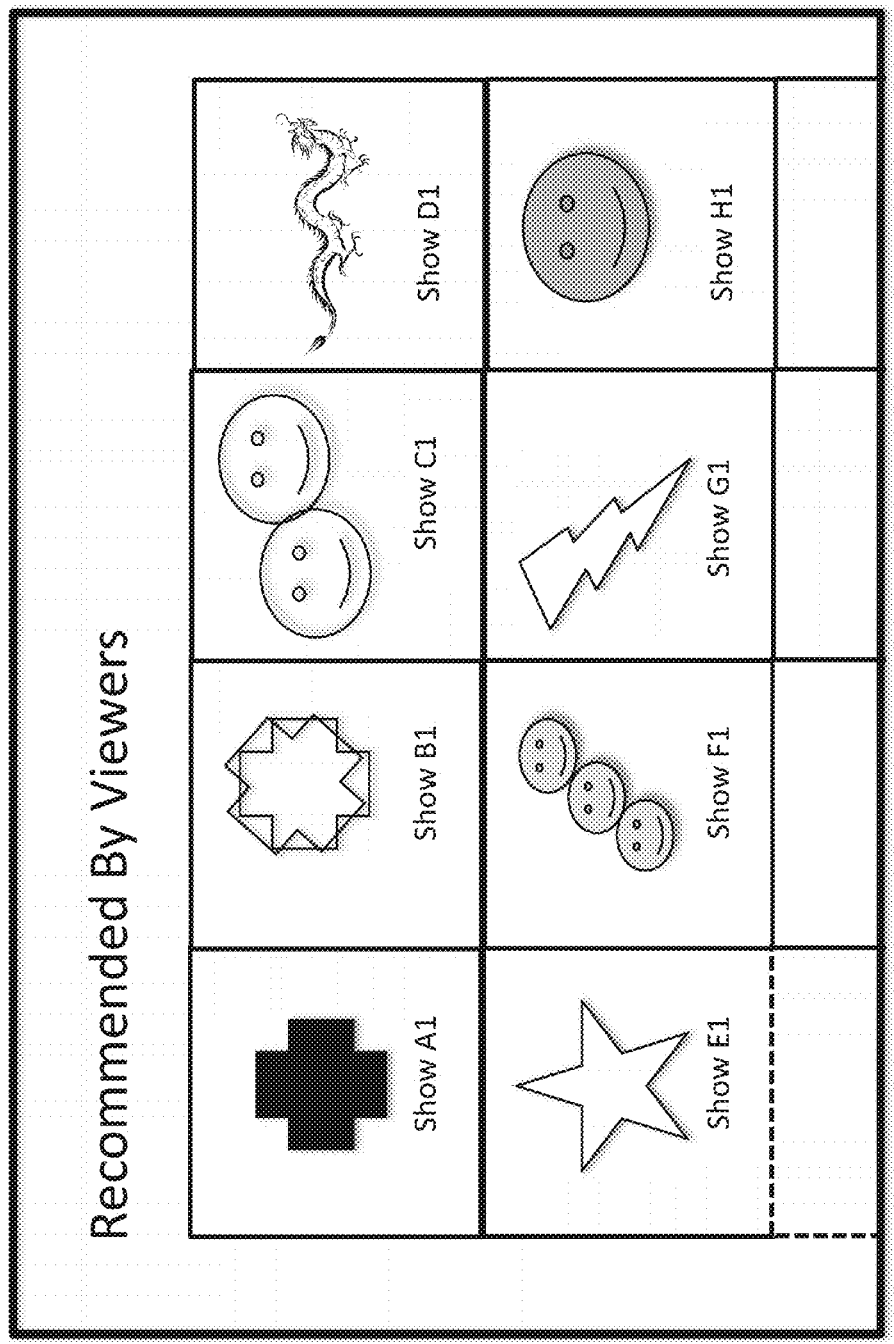
FIG. 2 is a representation of a gallery view display screen of recommended content according to one embodiment.

In some embodiments, the recommendations are presented in a gallery view display screen 200, as shown in FIG. 2, rather than as a listing in horizontal bar 108. Similarly, if the category "My Shows" is selected from vertical bar 106, a gallery view display screen rather than a horizontal bar listing may be used to present all the program content (e.g. shows) that the user has previously designated as a favorite, using methods described further below in paragraphs 24 through 28.

Figure 3:
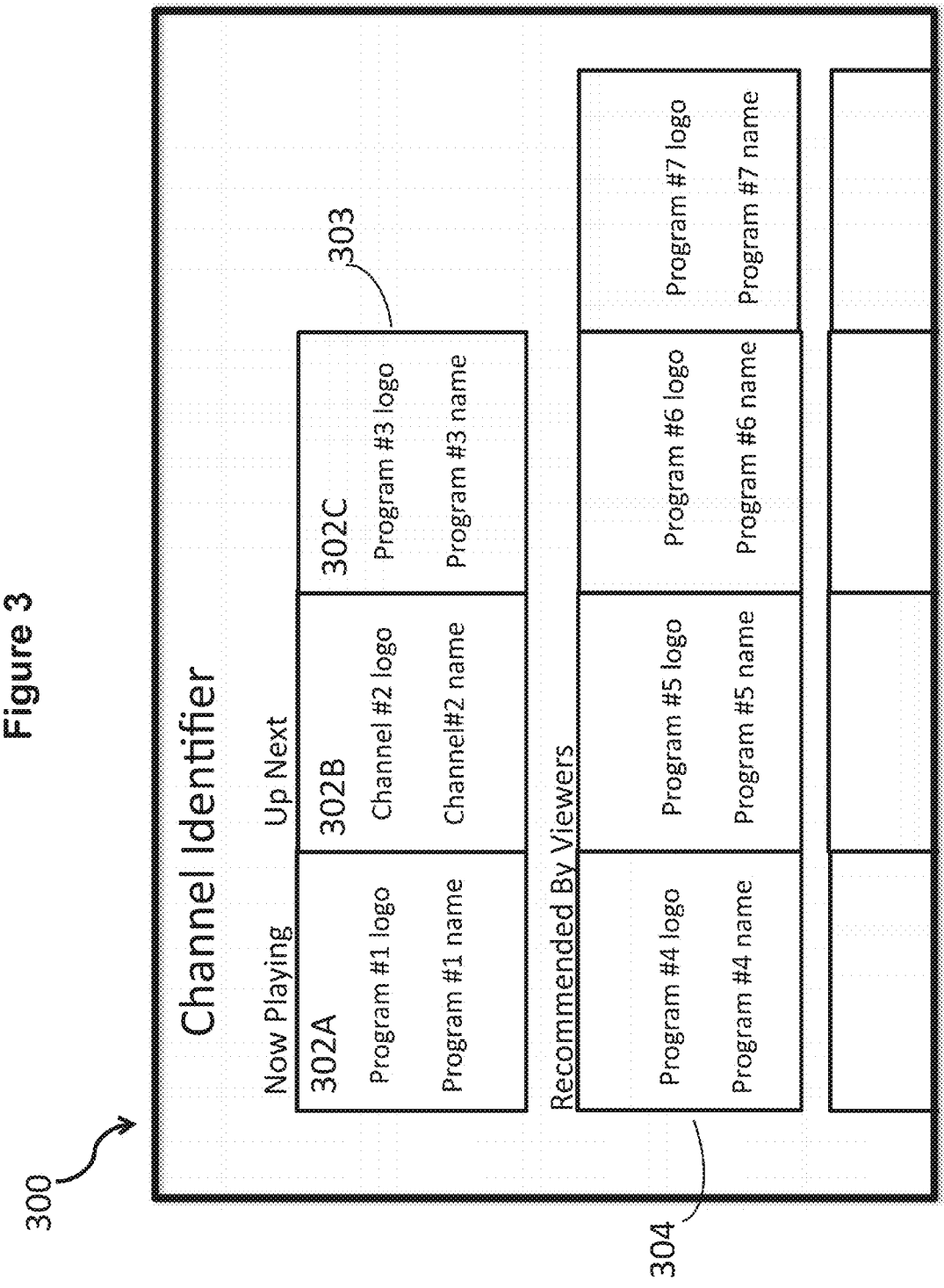
FIG. 3 is a representation of a gallery view display screen of content being presented on a particular channel.

In some embodiments, the selection of a content category results in the display of information being provided in a gallery format as opposed to the linear (e.g. horizontal bar) format described above. For example, when the user selects the "Favorite Channel" category, the main interface screen 100 is replaced by a Gallery View display screen 300 which provides a listing all of the content available to be viewed on the particular channel, as illustrated in FIG. 3. The display may take the form of tiles 302A-302C each typically including a recognizable program logo and the program name. The first row of the display 303 lists programs that are currently being played on the particular channel, as well as programs subsequently available for viewing on that channel. The second row of the display 304 lists programs that are available for viewing on that channel that have been recommended by viewers.

Figure 4:
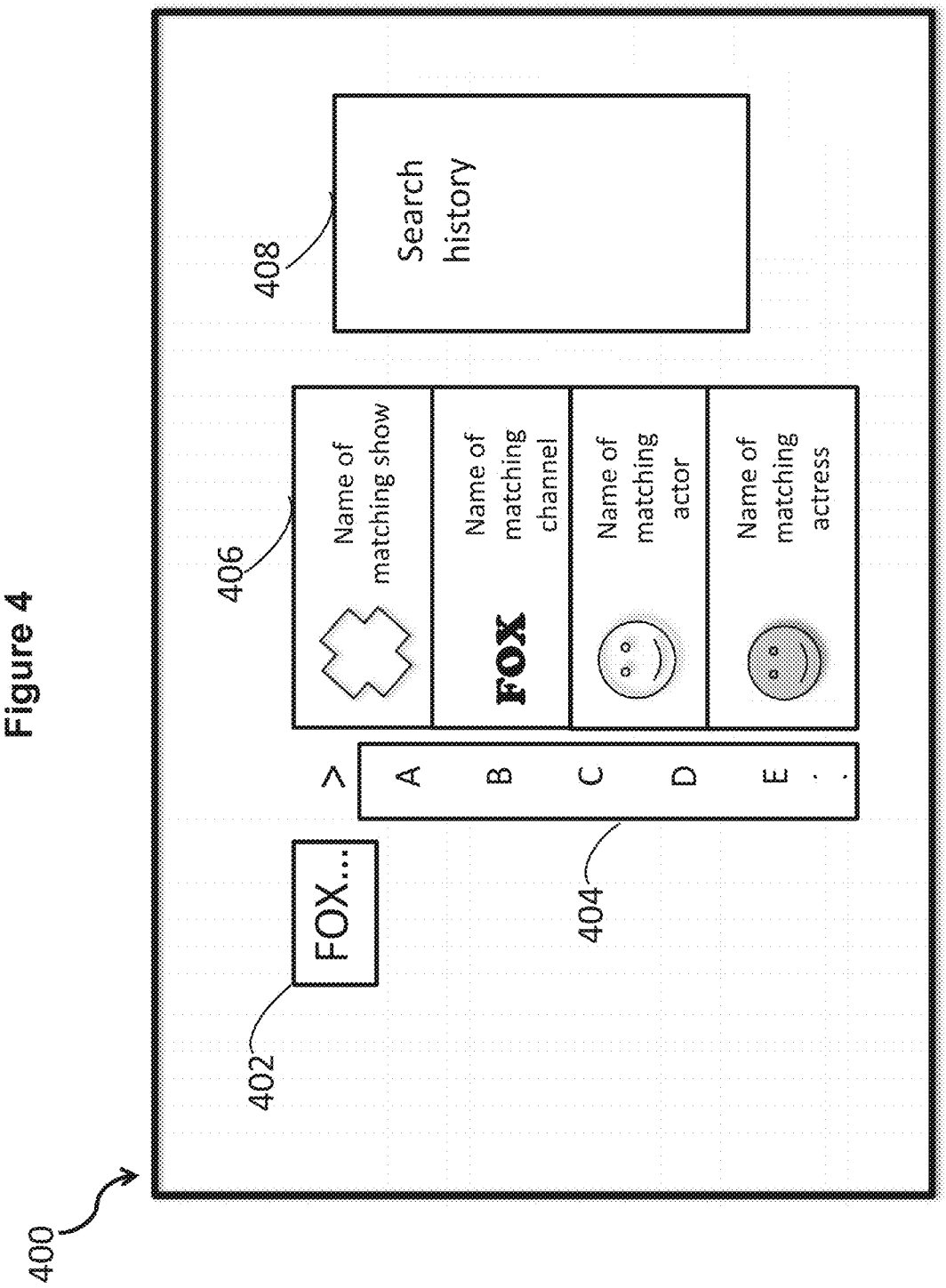
FIG. 4 is a representation of a Search interface screen according to one embodiment.

Returning to FIG. 1, one of the control icons 112 may be a search icon, typically shown as a representation of a hand-held magnifying glass. If a user selects the search icon, main interface screen 100 is replaced with a search interface screen 400, as shown in FIG. 4. When searching for content, the user selects a series 402 of alphanumeric characters (e.g. "FOX") from a rotating list of characters 404, rather than having to navigate a static keyboard. Title, channel, and/or actor name matches are presented as tiles 406 that may include images or other graphics, thereby providing a more visually appealing, interesting display with search results that are easier to recognize. Previous searches are also maintained on the display as a listing 408 for quick reference and repeat, if needed. More specifically, if the user were to select one of the searches listed in the Search History listing 408, the results of that previously conducted search will be presented in the results portion 406 of the display. The tiled search interface and corresponding functionality are described in greater detail in co-pending U.S. application Ser. No. 14,937,654, titled "Tiled Search Results", filed Nov. 10, 2015, as noted above.

Figure 5:
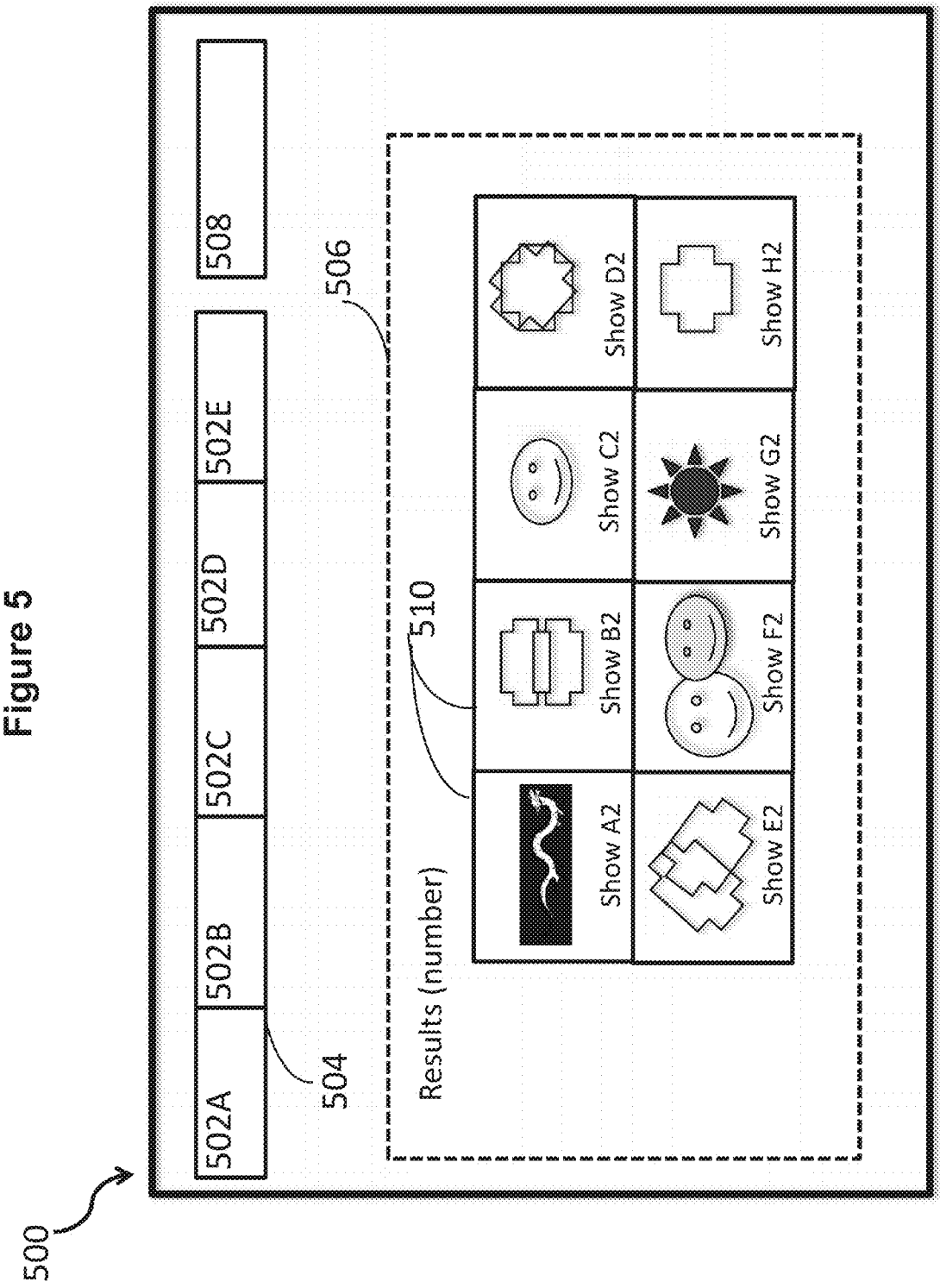
FIG. 5 is a representation of an Explore interface screen according to one embodiment.

In some embodiments, one of the control icons 112 in header 110 on main interface display 100 may be an explore icon, which may, for example, be a graphical representation of a flashlight. If a user selects the explore icon, main interface screen 100 is replaced with an explore interface screen 500, as shown in FIG. 5. This screen is designed to allow a user to easily browse all content that the user is authorized to view by using dynamic filtering, based on parameters provided by the user. The user selects from several drop down menus 502A-502E in dynamic filter area 504 particular parameters such as category, genre, content play length, age rating, and channel or content provider. The resulting content that matches the user criteria is provided on the results area 506 below dynamic filter area 504. The results may be further sorted by a number of different criteria, for example, popularity, time remaining for viewing, etc, using drop down menu 508. In this manner, the vast amount of content may be sorted and dynamically filtered with just a few selections based completely on the unique preferences of the user. Tiles 510 may be used to display the results, as shown. Changes in any of the drop down menu parameters 502A-502E or selection criteria 508 will cause the tiles 510 to dynamically change to reflect the current filter and sort criteria.

Figure 6:
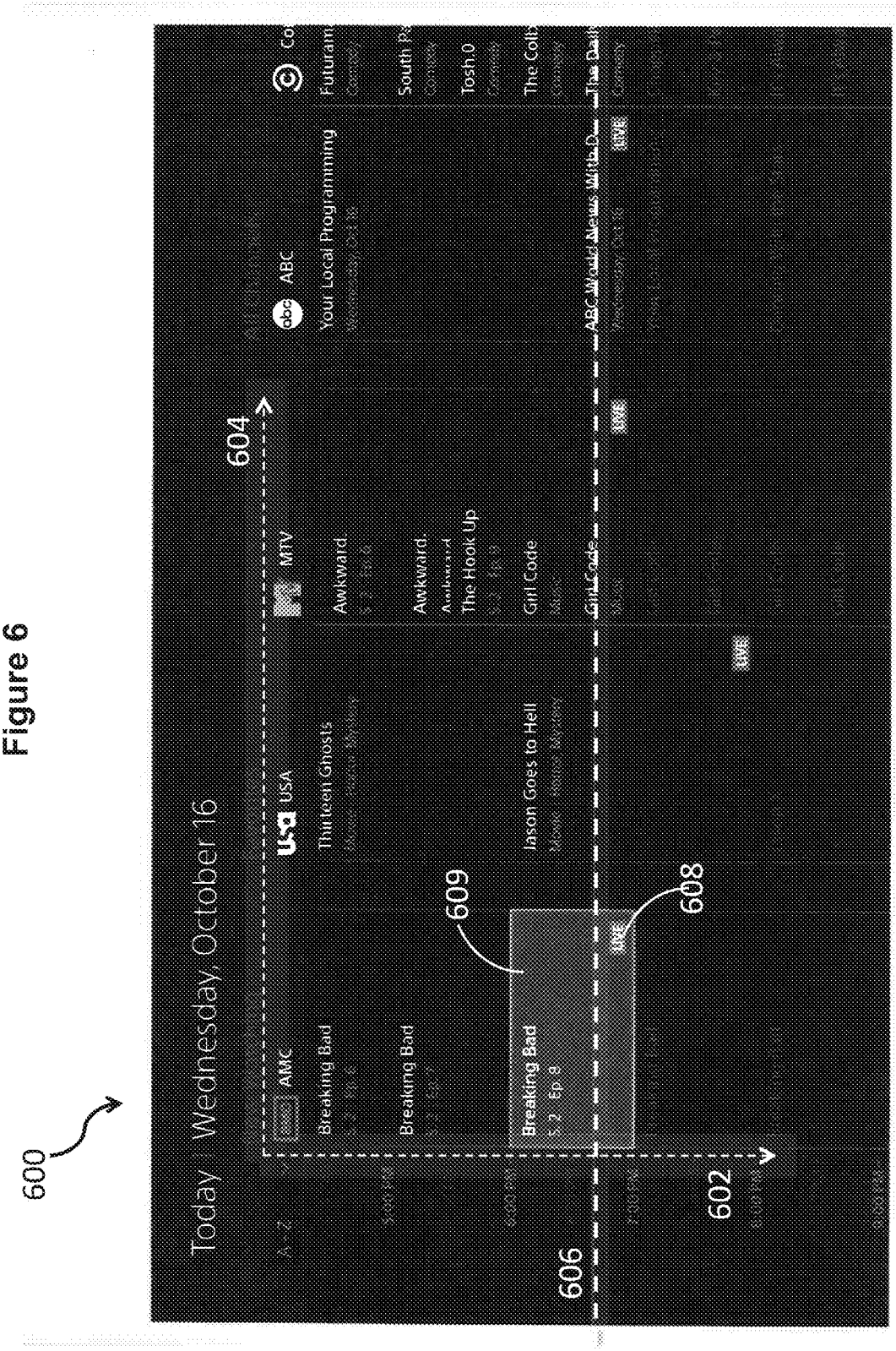
FIG. 6 is a representation of an Electronic Program Guide interface screen according to one embodiment.

In some embodiments, one of the control icons 112 in header 110 on main interface display 100 may be an electronic program guide (EPG) icon which may, for example, be a graphical representation of guide. When the user selects the EPG icon, the main interface screen 100 is replaced with an EPG interface 600 as illustrated in FIG. 6. The EPG interface 600 has a general grid shape with viewing times for content presented on the vertical axis 602 (e.g. rows) of the grid; content provider identifiers (which may be an icon, call letters, provider name, channel or identification number, etc.) are presented on the horizontal axis 604 (e.g. columns) of the grid. An elongated time indicator 606 traverses the entire horizontal width of the EPG interface 600 to provide the user with an indication of both the current time and the amount of time remaining in the currently playing program on the several channels accessible by the user. In an exemplary embodiment, the time indicator 606 (shown for convenience in FIG. 6 as a dashed white line) is presented as a red colored line. However, any suitable color or format which distinguishes the time indicator 606 from the remainder of the EPG interface 600 display components may be used.

A status indicator 608, for example "Live" as shown in the figure, or "Catchup" may be present in a time block 609 associated with a particular content provider to identify whether the program content being presented at a particular time is a live broadcast or has been stored for later retrieval and viewing. In an exemplary embodiment, the user may store up to twenty eight days of selected programming (e.g. content titles) for later retrieval and viewing. When selecting a time block, the display screen is transitioned from the EPG interface 600 to the playback screen associated with the selected content item. More specifically, the time block may be associated with a specific Uniform Resource Locator (URL) pointing to the corresponding content. If the user is authorized to access the content, the content is packaged and streamed to the user over an applicable connection, for example, the Internet or any suitable network connection. The EPG and its corresponding functionality are described in greater detail in U.S. application Ser. No. 14/937,618, titled "Customizable Electronic Program Guide", filed Nov. 10, 2015, which is incorporated in its entirety herein.

Figure 7:
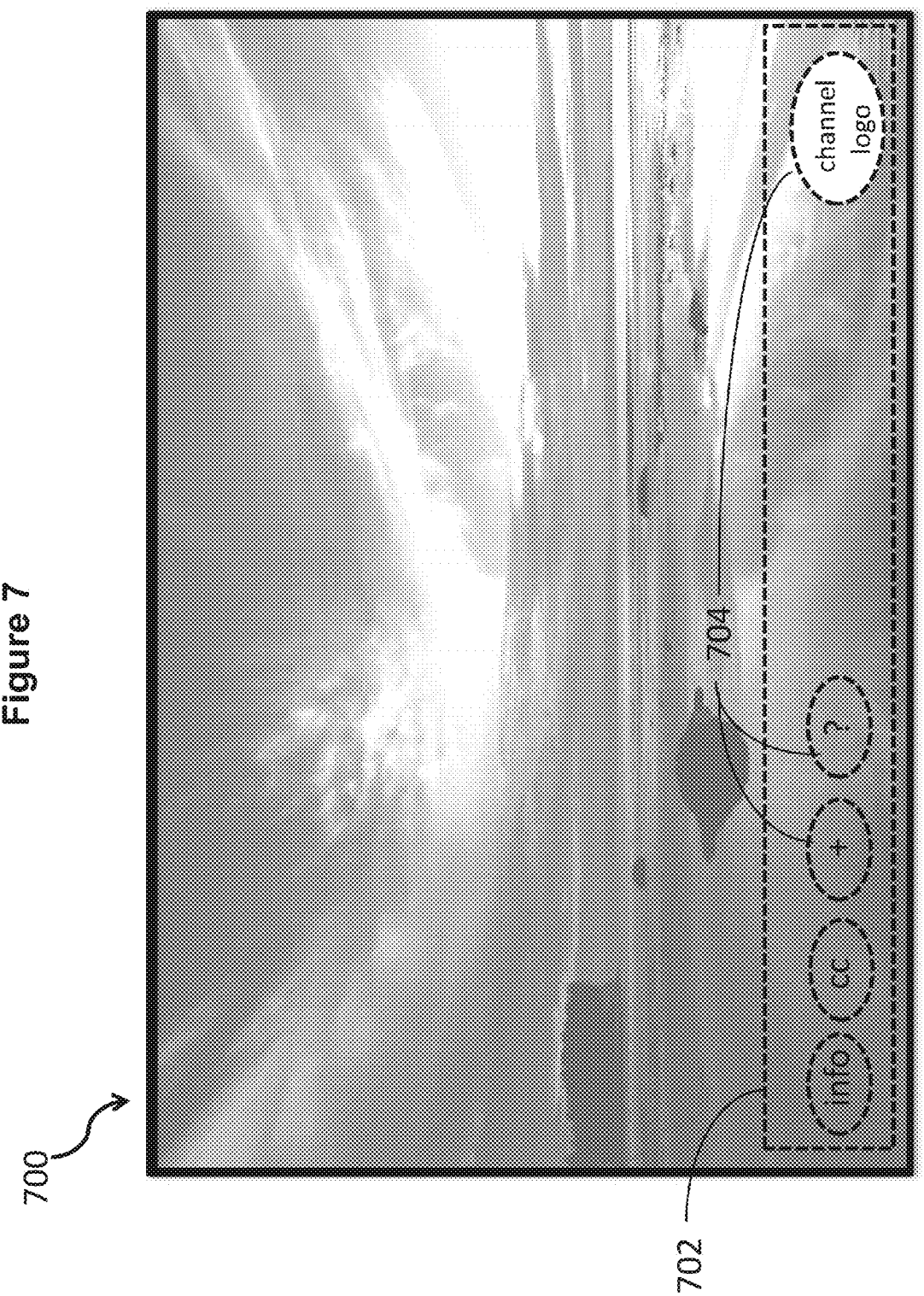
FIG. 7 is a representation of a media player interface screen according to one embodiment.

When the user selects a particular program from any one of the main interface screen 100, the search interface screen 400, the explore interface screen 500, the EPG screen 600 or gallery view display screens 200 and 300, the corresponding content is streamed from a content server to a corresponding media player (such as a television, game playing console etc) for presentation on the corresponding display. The display presents a media player interface screen, as shown in FIG. 7. Media player interface screen 700 includes a media player menu 702, including several functional buttons 704 thereon. Examples of functional buttons 704 include an information button, a close captioning button, a favorite button (typically indicated with either a "♥" symbol or a "+" sign or other suitable indicator) and a channel logo button.

Figure 8:
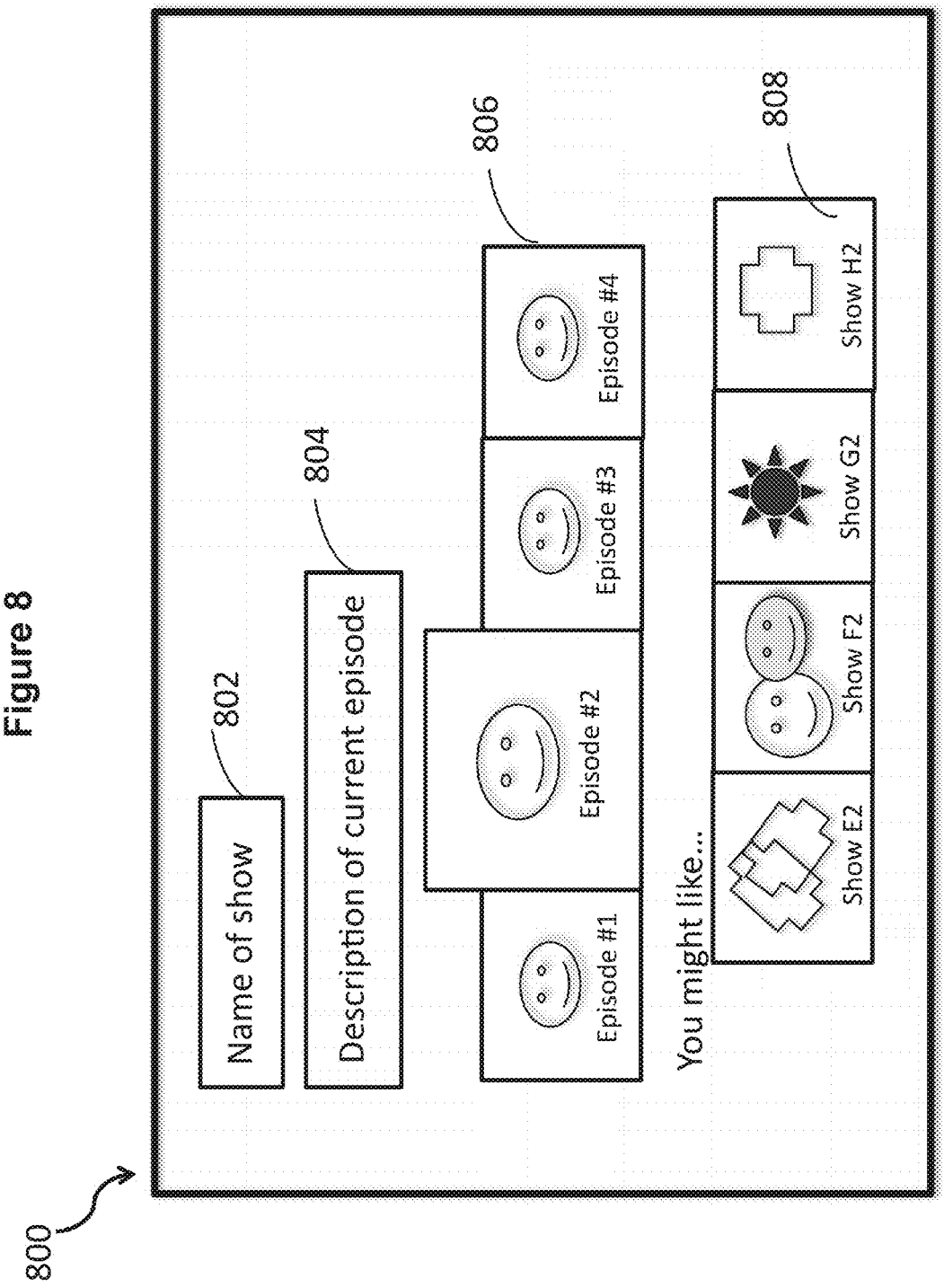
FIG. 8 is a representation of a program detail page according to one embodiment.

When the information (info) button 704 on media player interface screen 700 is pressed, a program detail page 800 is presented on the display, as shown in FIG. 8, and described further below. When the closed captioning (cc) button 704 on media player interface screen 700 is pressed, closed captioning for the content currently being played is enabled and presented on the display screen.

When the favorite (+) button 704 on media player interface screen 700 is pressed, the particular show being played is included in the user's list of favorite shows for viewing at later time. All available episodes of a favorite show are also made available for the user to view during their applicable viewing period. In some embodiments, the show currently being viewed and subsequent episodes of the show are recorded and saved, making each available for viewing at any time over a period of 28 days following the corresponding recording. This one-press method of designating a favorite show while watching it is a significant advantage provided by the present invention over the methods used in existing content delivery systems. The latter typically require several steps to be taken in sequence to achieve the same goal, detracting greatly from the user's enjoyment of the show being watched and overall user experience.

The channel logo (e.g. AMC) typically appears in a button 704 in the lower right hand corner of the media player menu 702. The user can select the channel logo, which causes the user system to navigate to a corresponding channel detail page. The channel detail page shows a timeline of what has played in the past, what is currently playing and what is coming up on the corresponding channel. The channel detail page also shows featured programming that can be selected to play.

In some embodiments, an alternative to selecting among options on the various displayed interface screens (e.g. a favorite icon on the media player interface screen) by directly navigating to and clicking on those options directly on the display is provided by including dedicated control buttons on an external control device. A hand-held remote controller, for example, may include a button with a "+" symbol thereupon, indicating addition, such that pressing that button while viewing a show on the display will immediately add the show to the user's list of favorites. In some embodiments, pressing that same "+" button while a show that was previously designated as a favorite will have the opposite effect, that of removing the show from the favorites list. Additional control buttons, for example, a button labelled "x" will act as a select button wherein when the user depresses the "x" button the corresponding feature being highlighted will be selected. Another control button labelled "●" will act as a return to previous screen function. A control button labelled "triangle" will return the user to the main interface screen 100 (FIG. 1). A control button labelled "square" will present detailed information in the foreground 102 (FIG. 1) of the display corresponding with the content being displayed in the background 104 (FIG. 1) of the display 101 (FIG. 1).

Returning to FIG. 8, program detail page 800 includes more detailed information regarding the selected piece of content being played as well as additional episodes that are available for viewing.

Figure 9:
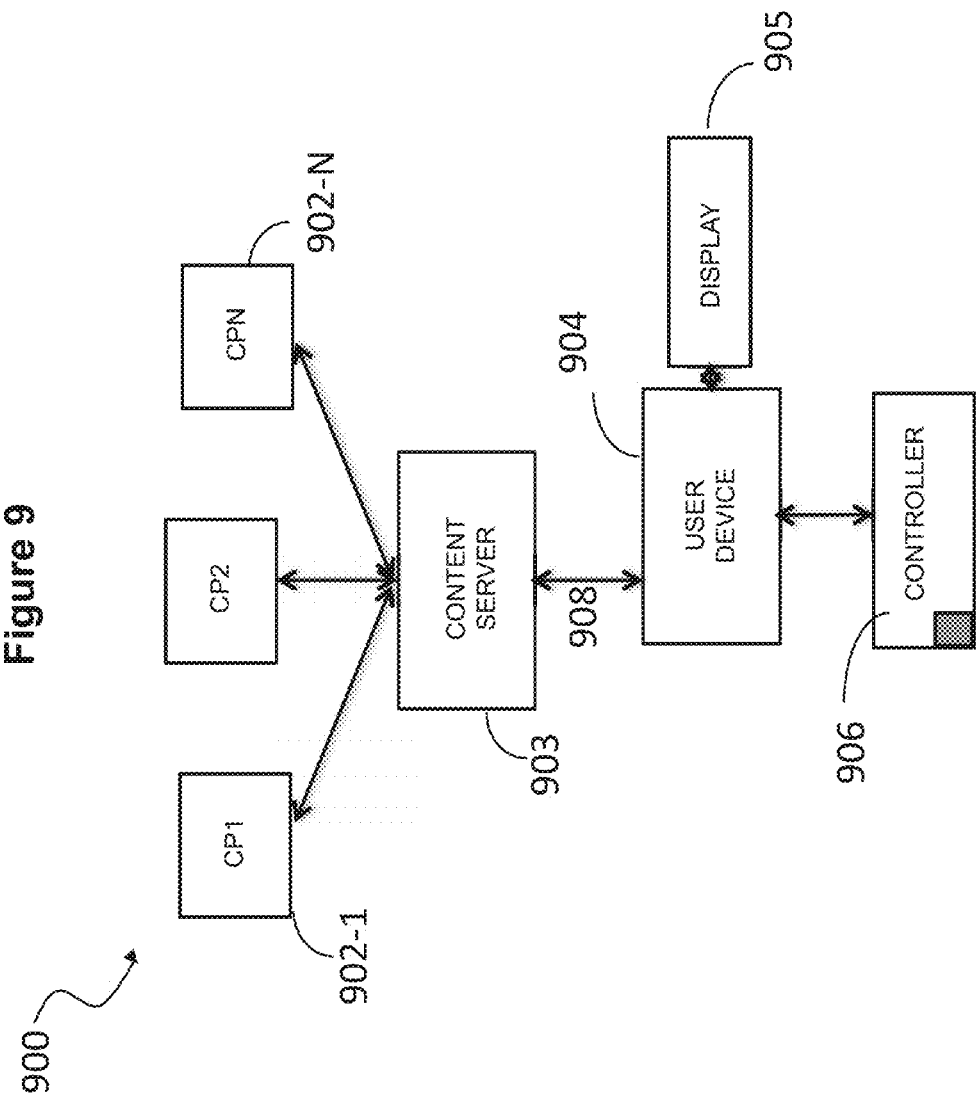
FIG. 9 is a schematic representation of a Cloud Based Content Delivery System according to one embodiment

FIG. 9 is a schematic representation of a system 900 configured to implement the Cloud Based content delivery service in one embodiment of the invention. Content providers 902-1-902-N, for example, network broadcast companies, television or movie studios, cable companies, independent film and television developers and individuals who record content for later upload and transmission to interested parties provide their respective content to one or more content servers 903. Content server 903 may include one or more memory banks and one or more processors configured to maintain and stream content to downstream user devices 904 via an applicable connection 908. The content server 903 may be local to a particular user location or remote from the user location.

The content server 903 may include hardware, software and/or a combination of hardware and software configured to maintain user account and preference information. In this manner, when a user (via their particular device 904) requests access to a particular piece of content, the content server 903 will be able to authenticate the user and stream the requested content to the user device 904 via an applicable connection 908. The user initially sets up an account including, identifying information, payment information, preference information (e.g. genre, music, age, etc.) and other information required by the content server 903 and or content providers 902-1 902-N to generate a profile. The account set up may also require the selection and payment of a particular tier of service, which will determine how many channels and how many unique items of content, for example, video-on-demand content the user will be authorized to access. The higher the tier level, the more content the user will have access to. In an alternate embodiment, the user may select individual channels to subscribe to; thereby, providing an added level of personalization in content choices.

When the user wants to access a particular piece of content, may it be through the cross-information timeline bar (FIG. 1), search functionality (FIG. 4), explore functionality (FIG. 5), electronic program guide (FIG. 6), recommendations (FIG. 2) or other suitable mechanism, a request is sent via URL to the corresponding content server 903 via applicable connection 908. The request is analyzed by the content server 903 to determine whether the user is authorized to access the request content. If the user is authorized to access the requested content, the content is streamed to the user's device 904 via connection 908 for display on the corresponding display device 905, for example, a television, a monitor, a display configured within or connected to a mobile device, etc. If the user is not authorized to access the requested content, a message will be presented to the user via display 905 indicating that the user is not authorized to access or receive such content. The system 900 may include one or more controller devices 906, for example, a G-Shock controller used in conjunction with a PlayStation 4 game console (e.g. user device 904) or other suitable device which controls the viewing and transfer of applicable interface screens as discussed in greater detail above.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for interactive delivery of cloud-based content to a user viewing a display, the method comprising:
   displaying a main interface screen on the display, the main interface screen comprising:
      a background, presenting selected streamed content;
      a foreground overlay, comprising a timeline-based cross information bar, the timeline-based cross information bar comprising intersecting vertical and horizontal bars of cells, the vertical bar comprising a scrollable listing of user-selectable content categories with one content category for each cell, and the horizontal bar comprising a listing of textual and graphical representations, images or scenes of user-selectable cloud-based content the user is authorized to access, with one item of content for each cell, each of the items of content represented in the horizontal bar corresponding to a user-selected category at the intersection of the vertical and horizontal bars; and a header, positioned near the top of the interface screen and extending horizontally across the interface screen, presenting a plurality of control icons;

wherein the display has a full width and a full height;

wherein the background extends across the full width and the full height of the display;

wherein, in response to a selection by the user of one of the content categories from the vertical bar, the horizontal bar extending to the right from the selected category listing is populated with representations of accessible content corresponding to the selected category;

wherein the content representations listed in the horizontal bar are presented in a time-based order, with time progression increasing from left to right; and wherein the content representation displayed in the leftmost position of the horizontal bar represents content currently playing in the background of the main interface screen, and has a size that is larger than the adjacent and subsequent content representations.

2. The method of claim 1 wherein at least one of the content representations displayed in the horizontal bar represents a recommendation of content for the user, the recommendation having been determined on the basis of one or more of the following criteria: viewing history of the user, one or more preferences previously stated by the user, and ratings or reviews by others in a social network to which the user belongs.

3. The method of claim 1 wherein one of the plurality of control icons is a search icon, and wherein in response to the selection of the search icon the method further comprises:

displaying a search interface screen presenting a series of alphanumeric characters from a rotating list of characters selectable by the user, wherein in response to the selection of characters, tiles corresponding to title and/or channel matches of authorized content are presented to the user.

4. The method of claim 1 wherein one of the plurality of control icons is an explore icon, and wherein in response to the selection of the explore icon the method further comprises:

displaying an explore interface screen comprising a first portion allowing the user to specify one or more criteria, and a second portion dynamically presenting, in response to the user's specified criteria, a listing of matching cloud-based content the user is authorized to access.

5. The method of claim 4 further comprising dynamic sorting of the listing of matching cloud-based content according to one or more criteria based on user preferences.

6. The method of claim 1 wherein one of the plurality of control icons is an electronic program guide icon, and wherein in response to the selection of a particular program guide content icon the method further comprises:

requesting the selected piece of content from a content server; and receiving a streamed version of the content from the content server.

7. The method of claim 1 further comprising, in response to the selection by the user of an item of content, displaying a media player interface screen, the media player interface screen comprising:

a background reaching the boundaries of the display and playing the selected content, the content being delivered by a channel;

a plurality of media player control icons; and a channel logo representing the channel delivering the content.

8. The method of claim 7 wherein one of the plurality of media player control icons is a favorite icon, and wherein in response to the selection of the favorite icon the method further comprises adding the show corresponding to the content being viewed on the media player interface screen to a list of favorite shows specific to the user.

9. The method of claim 8 further comprising, in response to the selection of the favorite icon, recording and saving the show currently being viewed and subsequent episodes of the show, making each available for viewing at any time over a predetermined number of days following the corresponding recording.

10. The method of claim 7 wherein in response to the selection of the channel logo icon the method further comprises:

displaying a channel detail page comprising:

a timeline listing of shows previously played on the channel, the show currently playing, and shows to become available on the channel; and featured programming available for selection on the channel.

11. The method of claim 7 wherein one of the plurality of media player control icons is an information icon, and wherein in response to the selection of the information icon the method further comprises:

displaying a program detail page comprising detailed information regarding the content being played and regarding additional episodes of the corresponding show that are available for viewing.

12. The method of claim 1 further comprising providing the user with a manual controller comprising a search button, such that in response to the depression of the search button, a search interface screen appears on the display, presenting a series of alphanumeric characters from a rotating list of characters selectable by the user, wherein in response to the selection of characters, title and/or channel matches in the cloud-based content are presented to the user as a display of tiles.

13. The method of claim 1 further comprising providing the user with a manual controller comprising a favorite button, such that in response to the user depressing the favorite button while viewing content playing on the media player interface screen, the show corresponding to the content being viewed on the media player interface screen is added to a list of favorite shows specific to the user.

14. An apparatus comprising:

one or more processors; and software encoded in one or more non-transitory tangible media for execution by the one or more processors and when executed operable to interactively deliver cloud based content to a user by:

displaying a main interface screen on the display, the main interface screen comprising:
- a background, presenting selected streamed content;
- a foreground overlay, comprising a timeline-based cross information bar, the timeline-based cross information bar comprising intersecting vertical and horizontal bars of cells, the vertical bar comprising a scrollable listing of user-selectable content categories with one content category for each cell, and the horizontal bar comprising a listing of textual and graphical representations, images or scenes of user-selectable cloud-based content the user is authorized to access, with one item of content for each cell, each of the items of content represented in the horizontal bar corresponding to a user-selected category at the intersection of the vertical and horizontal bars; and
- a header, positioned near the top of the interface screen and extending horizontally across the interface screen, presenting a plurality of control icons;

wherein the display has a full width and a full height;

wherein the background extends across the full width and the full height of the display;

wherein, in response to a selection by the user of one of the content categories from the vertical bar, the horizontal bar extending to the right from the selected category listing is populated with representations of accessible content corresponding to the selected category;

wherein the content representations listed in the horizontal bar are presented in a time-based order, with time progression increasing from left to right; and wherein the content representation displayed in the left-most position of the horizontal bar represents content currently playing in the background of the main interface screen, and has a size that is larger than the adjacent and subsequent content representations.

* * * * *